United States Patent
Li

(10) Patent No.: US 8,294,682 B2
(45) Date of Patent: Oct. 23, 2012

(54) DISPLAYING SYSTEM AND METHOD THEREOF

(75) Inventor: Wei Li, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 689 days.

(21) Appl. No.: 12/549,369

(22) Filed: Aug. 28, 2009

(65) Prior Publication Data

US 2010/0271318 A1 Oct. 28, 2010

(30) Foreign Application Priority Data

Apr. 28, 2009 (CN) .......................... 2009 1 0301922

(51) Int. Cl.
*G06F 3/041* (2006.01)
(52) U.S. Cl. .......................... 345/173; 345/698; 345/660
(58) Field of Classification Search ........................ None
See application file for complete search history.

(56) References Cited

U.S. PATENT DOCUMENTS

2010/0020221 A1* 1/2010 Tupman et al. ............... 345/173
* cited by examiner

*Primary Examiner* — Muhammad N Edun
(74) *Attorney, Agent, or Firm* — Altis Law Group, Inc.

(57) ABSTRACT

A displaying system includes a touch screen for displaying images and/or icons thereon and providing a communicating interface; a detecting module for detecting operations on the touch screen; a setting module for setting a zoom area and/or a zoom mode in response to user inputs; a characteristic computing module for computing the location and the trace of a drawing on the touch screen and comparing the computing result with the predetermined information and thereby determining a matching zoom mode and a selection mode; a controlling module for controlling the touch screen to zooming in/out the selected object(s) corresponding to a matched zoom mode and zoom area selection mode; and a storage module for storing predetermined information corresponding to the zoom modes, the detecting result of the detecting module, the computing result of the computing module, and providing memory space for the displaying system.

11 Claims, 9 Drawing Sheets

DISPLAYING SYSTEM AND METHOD THEREOF

BACKGROUND

1. Technical Field

The present disclosure relates to a displaying system and a method thereof.

2. Description of Related Art

To view details of images/icons on a display, most conventional electronic devices provide a function of enlarging a portion of the images/icons by complicated operations via menus and/or dialog boxes. This is inconvenient.

What is needed, therefore, is a displaying system and method to overcome the above-mentioned problems.

DETAILED DESCRIPTION

Figure 1:
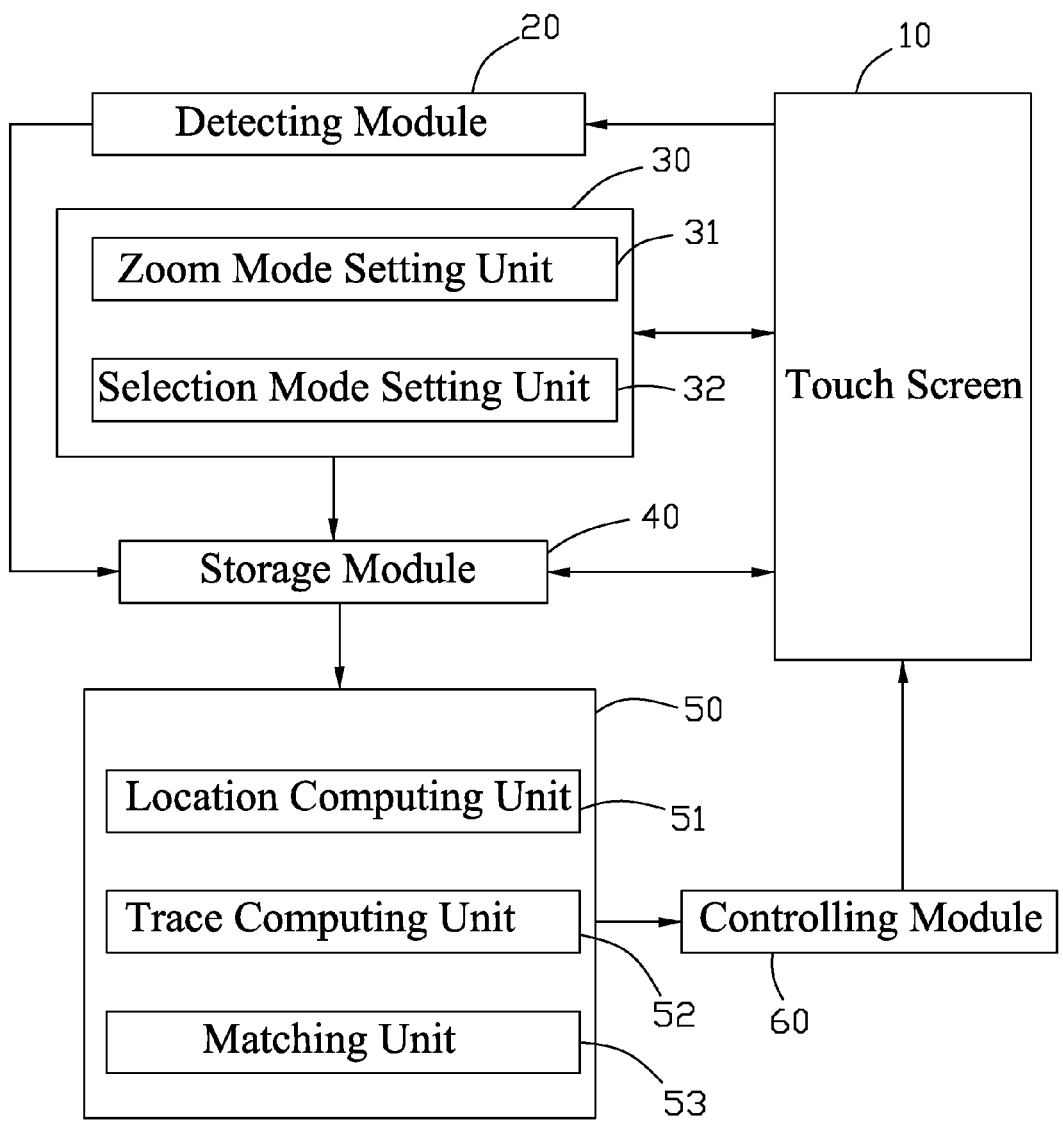
FIG. 1 is a functional block diagram of a displaying system, according to an exemplary embodiment.

Referring to FIG. 1, a displaying system 100, according to an exemplary embodiment, is shown. The displaying system 100 can be implement in an electronic device with displaying function, such as a desktop or laptop computer, a satellite navigation device, a mobile phone, a camera, or a gaming device. The displaying system 100 includes a touch screen 10, a detecting module 20, a setting module 30, a storage module 40, a characteristic computing module 50, and a controlling module 60.

The touch screen 10 is configured for displaying images and/or icons and providing a user interface. The touch screen 10 can be a liquid crystal display (LCD) based touch screen.

The detecting module 20 is configured for detecting operations on the touch screen 10. In this embodiment, the touch screen 10 can be a resistive detecting module, a surface acoustic wave detecting module, a capacitive detecting module, or an infrared detecting module.

The setting module 30 is configured for setting a zoom area selection mode and/or a zoom mode in response to user inputs, e.g., operations on the touch screen 10 or on a keyboard. In this embodiment, the setting module 30 responds to operations on the touch screen 10. For example, the setting module 30 can present an operation menu or a dialog box on the touch screen 10. Then, the user can input setting commands through the operation menu or the dialog box. The setting module 30 includes a zoom mode setting unit 31 and a selection mode setting unit 32. The zoom mode setting unit 31 is configured for setting a mode of zooming in/out objects, e.g., image(s) and/or icon(s) highlighted on the touch screen 10. The selection mode setting unit 32 is configured for setting a selection mode of object(s) to be highlighted.

The zoom mode setting unit 31 can provide a first mode and a second mode for user to choose. In the first mode, when the area of the object(s) is selected, the area can be zoomed in to occupy a portion of the touch screen 10. In the second mode, when the area of the image is selected, the area can be zoomed in to occupy the entire touch screen 10.

The selection mode setting unit 32 can provide an irregular selection mode and a regular selection mode for user to choose. The irregular selection mode allows a user to select object(s) by tracing an irregular pattern, e.g., an irregular curve, on the touch screen 10 using a finger or a stylus. The regular selection mode allows a user to select object(s) by tracing a regularly pattern on the touch screen 10. Each regular drawing, e.g., a character, is associated with a corresponding zooming operation on the selected object(s). For example, if a user writes a character "Z", it may be predetermined that all the object(s) intersecting the trace be zoomed in. In another example, if the user writes an "S," it is predetermined that all the object(s) intersecting the trace by the written will be zoomed out. All the zooming operations are associated with the regular drawings before use.

The storage module 40 is configured for storing settings corresponding to the zoom modes, e.g., the first mode and the second mode, and the selection modes, e.g., the regular mode and the irregular mode. The storage module 40 is also configured for buffering detected results of the detecting module 20, computing results of the computing module 50 temporarily, and providing memory space for the displaying system 100. In detail, the storage module 40 includes a volatile memory and a non-volatile memory. The volatile memory is configured for buffering the detecting results of the detecting module 20, the computing results of the computing module 50 temporarily, and providing memory space for the displaying system 100. The non-volatile memory is configured for storing predetermined information corresponding to the zoom modes and the selection modes.

The characteristic computing module 50 is configured for computing the location of the trace on the touch screen 10 and the pattern of the trace. The characteristic computing module 50 is also configured for comparing the trace of the drawings with the predetermined information and thereby determining a matching zoom mode and a selection mode. For example, when a regular selection mode is predetermined, and the "Z" character is predetermined as a first mode. If it is compared and determined that the drawing is "Z" character, then the selected object(s) is zoomed in to occupy the entire touch screen 10. The characteristic computing module 50 includes a location computing unit 51, a trace computing unit 52, and a matching unit 53.

The location computing unit 51 is configured for computing the coordinates of the drawing to determine the location of the drawing on the touch screen 10, based on the detecting results of the detecting module 20.

The trace computing unit 52 is configured for computing the trace of a drawing on the touch screen 10 based on the detecting results of the detecting module 20.

The matching unit 53 is configured for comparing the computing results of the location computing unit 51 and the trace computing unit 52 with the predetermined information to look up matches.

The controlling module 60 is configured for controlling the touch screen 10 to zoom in/out selected object(s) under a corresponding matched zoom mode and zoom area selection mode.

Figure 2:
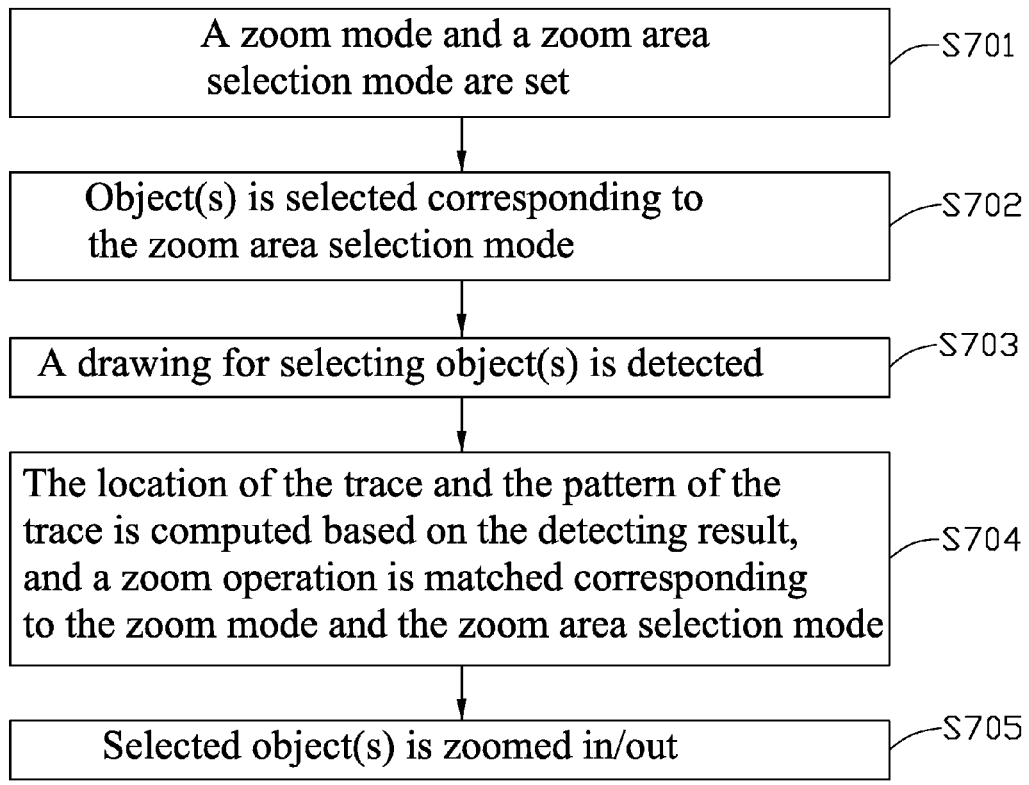
FIG. 2 is a flowchart of a displaying method, according to an exemplary embodiment.

Referring to FIG. 2, a displaying method is shown. The displaying method includes following steps:

In step S701, a zoom mode and a zoom area selection mode are set. In this step, the touch screen 10 shows an operation menu or a dialog box to the user, the user can input commands by performing operations on the operation menu or the dialog box to set zoom mode and zoom area selection mode.

In step S702, object(s) is selected corresponding to the zoom area selection mode. The zoom area is selected by drawing on the touch screen 10 using a finger or a stylus, what the touch screen 10 shows slid across by the drawing is selected.

In step S703, a drawing for selecting object(s) is detected. This step can be performed by the detecting module 20.

In step S704, the location of the trace and the pattern of the trace are computed based on the detecting result, and a zoom operation is matched corresponding to the zoom mode and the zoom area selection mode. This step can be performed by the characteristic computing module 50.

In the step S705, selected object(s) is zoomed in/out. This step can be performed by the touch screen 10 under the control of the controlling module 60.

Figure 3A:
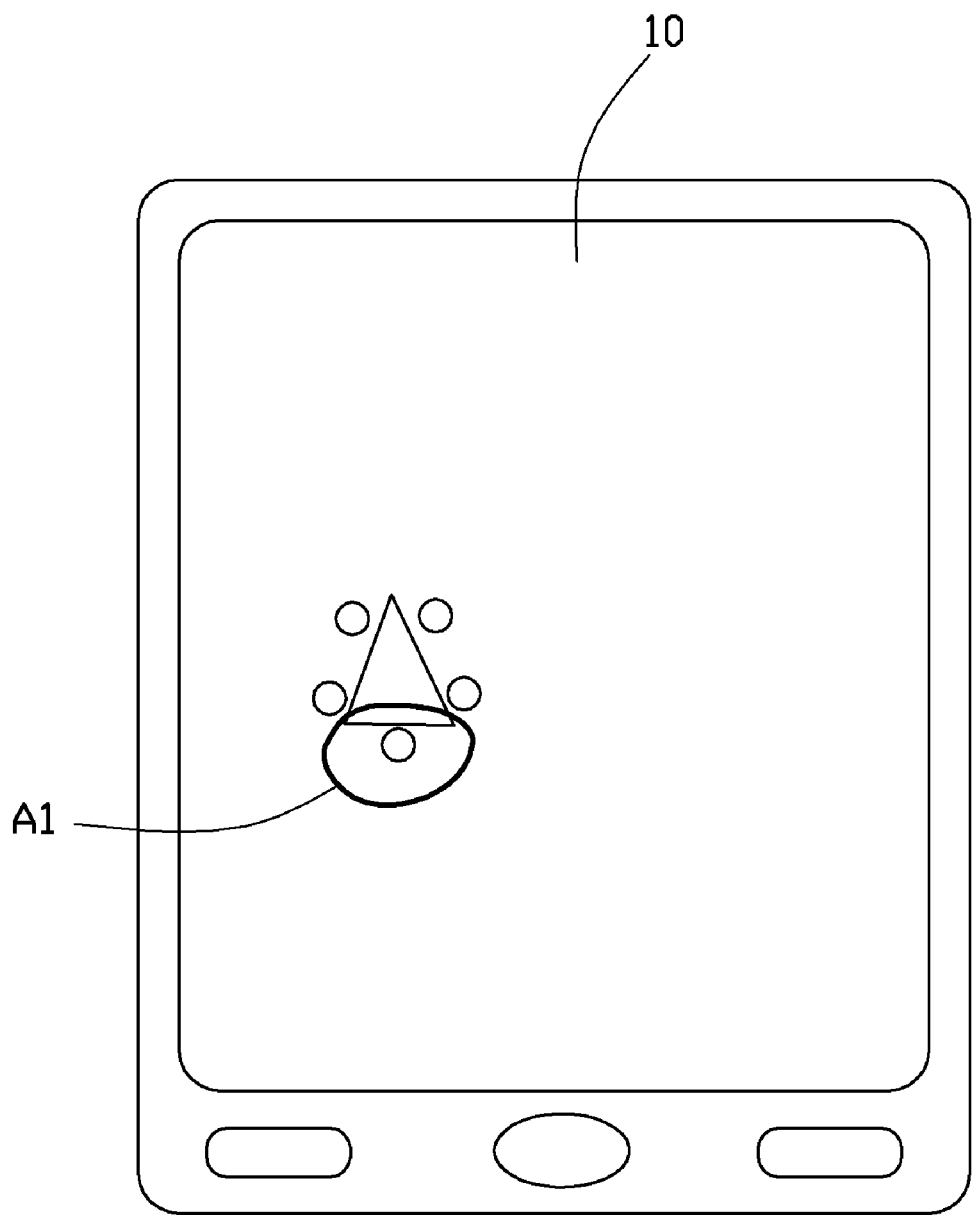
FIGS. 3A-3B are schematic views of an example of displaying on a touch screen of FIG. 1.
Figure 3B:
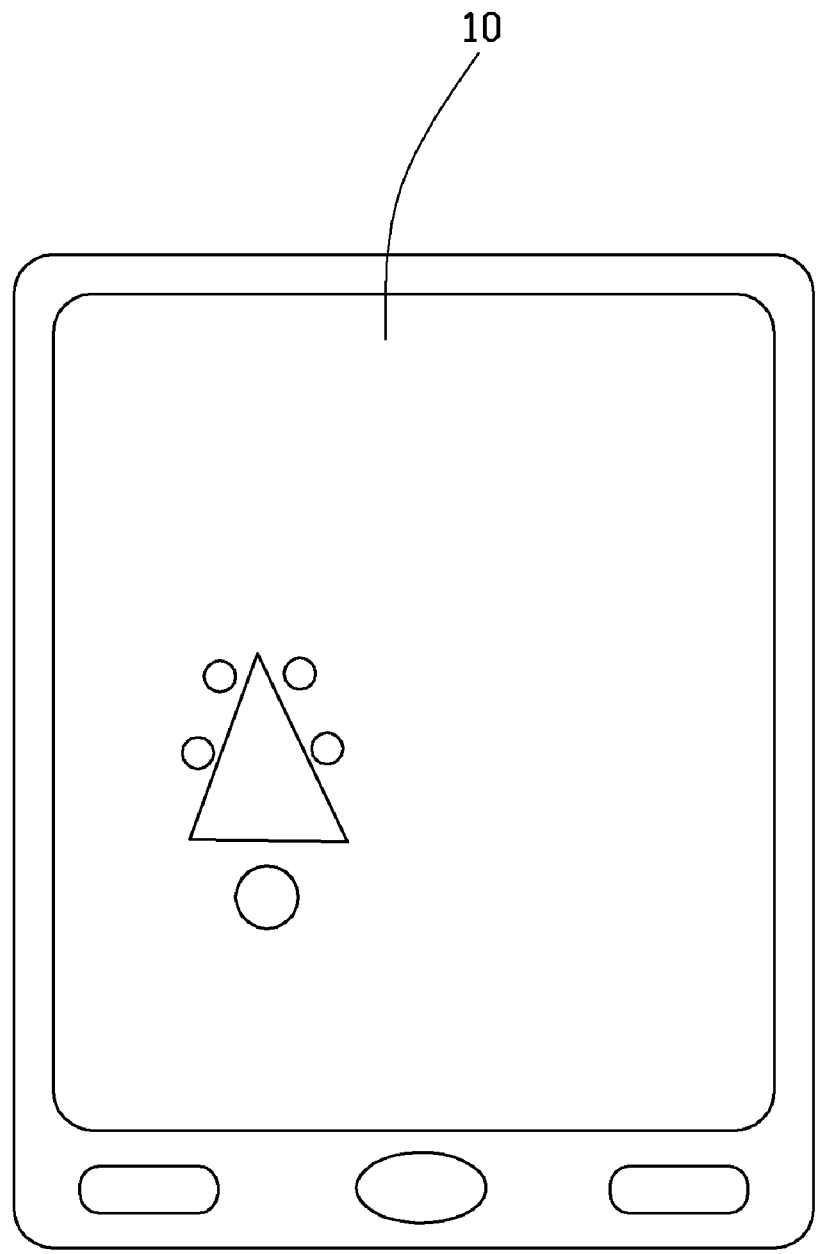

Referring to FIGS. 3A and 3B, an example of the zoom displaying on the touch screen 10 is shown. In this example, a first mode and an irregular selection mode are predetermined. When the trace A1 of a drawing slides across a portion of the touch screen 10, what the touch screen 10 shows in the trace A1 is zoomed in, the zoomed area occupies a portion of the touch screen 10.

Figure 4A:
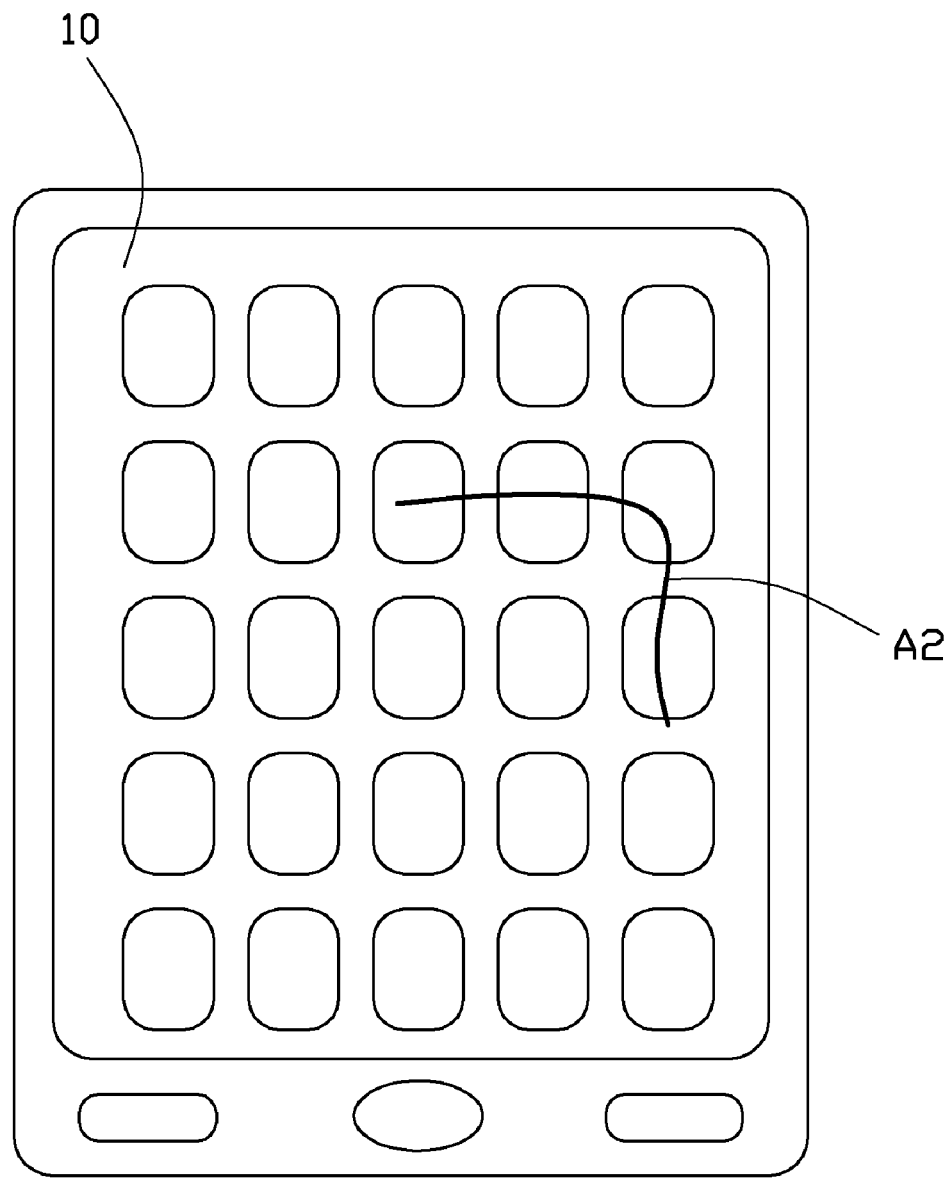
FIGS. 4A-4B are schematic views of another example of displaying on the touch screen of FIG. 1.
Figure 4B:
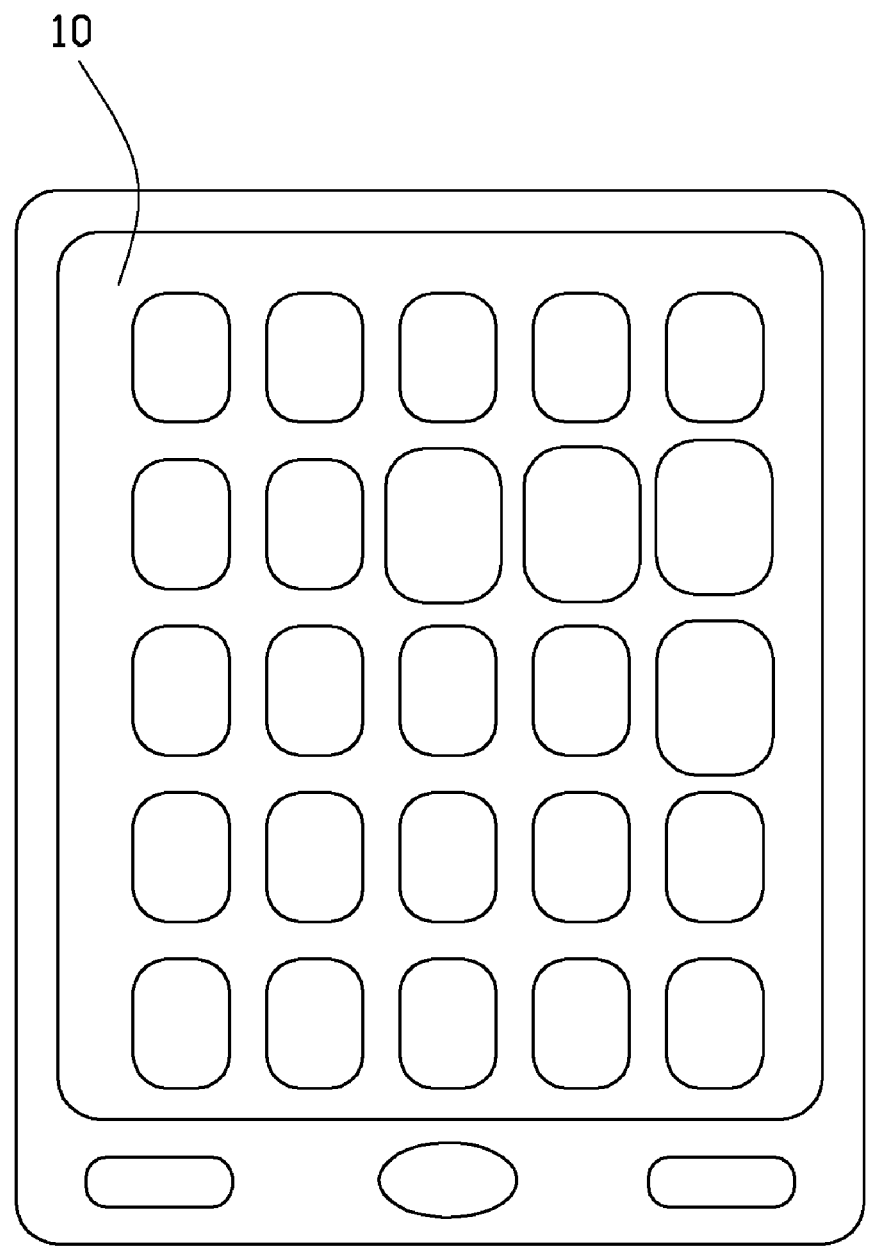

Referring to FIGS. 4A and 4B, another example of the zoom displaying is shown. In this example, a first mode and an irregular selection mode are predetermined. When the trace A2 of a drawing slides across a portion of the touch screen 10, what the touch screen 10 shows intersecting the trace A2 is zoomed in, the zoomed area is shown on a partial portion on the touch screen 10.

Figure 5A:
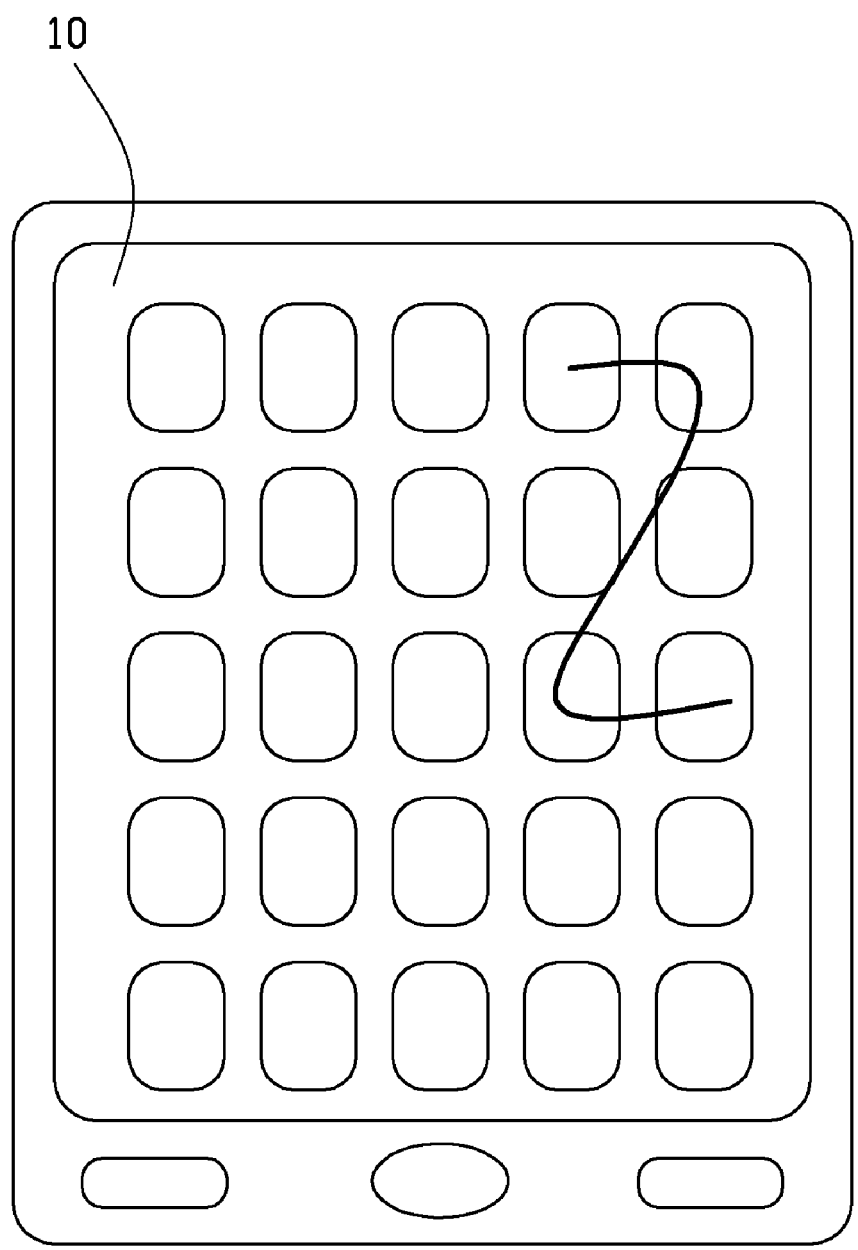
FIGS. 5A-5C are schematic views of another example of displaying on the touch screen of FIG. 1.
Figure 5B:
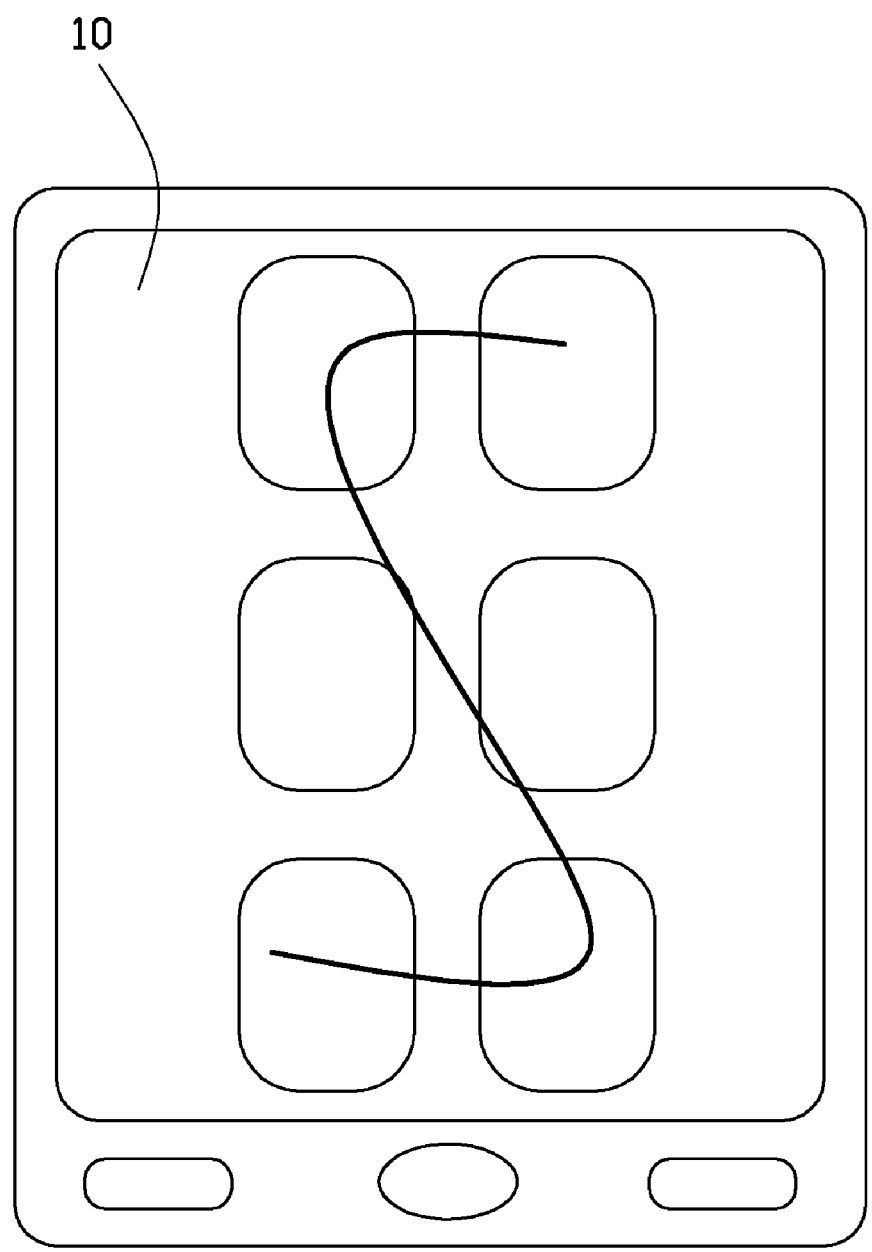
Figure 5C:
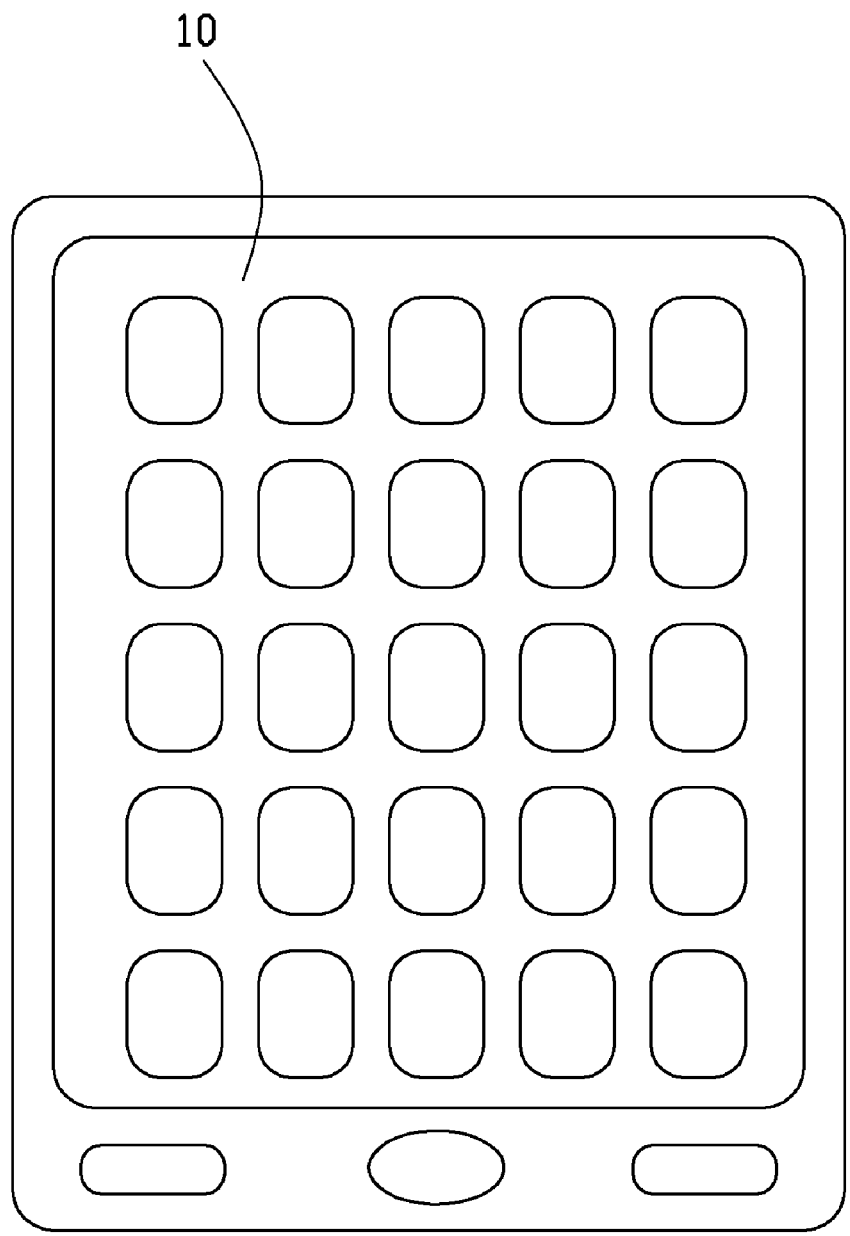

Referring to FIGS. 5A-5C, another example of the zoom displaying is shown. In this example, a regular selection mode is predetermined, the shape "Z" is defined as zooming in the selected object(s) to occupy the entire touch screen 10, the shape "S" is defined as zooming out the selected object(s) to original size. When a "Z" shaped trace of a drawing slides across a portion of the touch screen 10, what the touch screen 10 shows intersecting the "Z" shaped trace is zoomed in to occupy the entire touch screen 10; when an "S" shaped trace of a drawing slides across the zoomed in area of the touch screen 10, what the touch screen 10 shows intersecting the "S" shaped trace is zoomed out as the original size.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A displaying system used for an electronic device, comprising:
 a touch screen configured for displaying images and/or icons thereon and providing a communicating interface;
 a detecting module configured for detecting operations on the touch screen;
 a setting module configured for setting a zoom area selection mode and/or a zoom mode in response to user inputs;
 a characteristic computing module configured for computing the location of a drawing on the touch screen and the trace of the drawing, comparing the trace of the drawing with predetermined information and thereby determining a matched zoom mode and a zoom area selection mode;
 a controlling module configured for controlling the touch screen to zoom in/out selected object(s) corresponding to the matched zoom mode and zoom area selection mode; and
 a storage module configured for storing the predetermined information corresponding to the zoom modes, a detecting result of the detecting module, a computing result of the characteristic computing module, and providing memory space for the displaying system.

2. The displaying system of claim 1, wherein the touch screen is selected from the group consisting of the resistive touch screen, the surface acoustic wave touch screen, the capacitive touch screen, and the infrared touch screen.

3. The displaying system of claim 1, wherein the setting module comprises a zoom mode setting unit configured for setting a mode of zooming in/out object(s) selected by operation and a selection mode setting unit configured for setting a mode of selection of objects to be zoomed in/out.

4. The displaying system of claim 3, wherein the zoom mode setting module provides a first mode and a second mode for user to choose, the first mode zooms in selected object(s) to occupy a portion of the touch screen, and the second mode zooms in selected object(s) to occupy the entire touch screen.

5. The displaying system of claim 3, wherein the area selection mode setting module provides an irregular selection mode and a regular selection mode for user to choose, the irregular selection modes allows a user to select object(s) by drawing irregularly on the touch screen, and the regular selection mode allows a user to select object(s) by drawing regularly on the touch screen associated with a corresponding zooming operation on the selected object(s).

6. The displaying system of claim 1, wherein the setting module presents an operation menu or a dialog box on the touch screen, and the user inputs setting commands through the operation menu or the dialog box.

7. The displaying system of claim 1, wherein the storage module comprises a volatile memory and a non-volatile memory, the volatile memory is configured for buffering the detecting result of the detecting module, the computing result of the computing module temporarily, and providing memory space for the displaying system, and the non-volatile memory is configured for storing predetermined information corresponding to the zoom modes and the zoom area selection modes.

8. The displaying system of claim 1, wherein the characteristic computing module comprises:
 a location computing unit configured for computing the coordinates of the drawing to determine the location of the drawing on the touch screen, based on the detecting result of the detecting module;
 a trace computing unit configured for computing the trace of a drawing on the touch screen based on the detecting results of the detecting module; and
 a matching unit configured for comparing the computing result of the location computing unit and the trace computing unit with the predetermined information to look up matches.

9. A displaying method applied in an electronic device, comprising:
 providing a storage module storing predetermined information corresponding to zoom modes;
 displaying images and/or icons on a touch screen of the electronic device;
 detecting operations on the touch screen;
 setting a zoom mode and a zoom area selection mode in response to user inputs;

computing the location of a drawing on the touch screen and the trace of the drawing, comparing the trace of the drawing with the predetermined information and thereby determining a matching zoom mode and a selection mode; and controlling the touch screen to zoom in/out a selected object(s) corresponding to the matched zoom mode and zoom area selection mode.

10. The displaying method of claim 9, wherein an operation menu or a dialog box is shown, and the user inputs commands by performing operations on the operation menu or the dialog box to set a zoom mode and zoom area selection mode.

11. The displaying method of claim 9, wherein the zoom area is selected by drawing on the touch screen using a finger or a stylus, and what the touch screen shows slid across by the trace of a drawing is selected.

* * * * *